United States Patent [19]
Hahn et al.

[11] Patent Number: 6,137,422
[45] Date of Patent: Oct. 24, 2000

[54] COMMUNICATIONS SYSTEM AND METHOD WITH D/A CONVERTER

[75] Inventors: Scott Hahn, Apple Valley, Minn.; Mark T. Van Horn, Boise, Id.

[73] Assignee: Micron Technology, Inc., Bosie, Id.

[21] Appl. No.: 09/316,329

[22] Filed: May 21, 1999

[51] Int. Cl.[7] .......................... G08C 19/00; G08B 13/14; H04Q 5/22

[52] U.S. Cl. .................................. 340/825.69; 340/572.1; 340/10.1; 340/10.33; 340/825.72; 340/10.34; 340/10.51

[58] Field of Search ........................ 340/825.69, 825.72, 340/825.46, 10.1, 10.3, 10.31, 10.32, 10.33, 10.51, 10.5, 825.44, 572.1, 505; 700/290, 245; 701/2; 463/37–39; 341/176, 144

[56] References Cited

U.S. PATENT DOCUMENTS

| | | | |
|---|---|---|---|
| 5,019,815 | 5/1991 | Lemelson et al. | 340/572.1 |
| 6,046,676 | 4/2000 | Ward et al. | 340/572.1 |

OTHER PUBLICATIONS

Micron Communications, Inc. Data Sheets: "MicroStamp Engine SOIC", pp. 1 and 2, Feb. 20, 1998.
Linear Technology Data Sheets: LTC 1197/LTC 1197/L/ LTC 1199/LTCA 1199L, pp. 1 and 2., May 1999.
National Semiconductor Data Sheets: "MM54HC160/ MM74HC160 Synchronous Decade Counter with Asynchronous Clear . . . ", pp. 3–142 and 3–143; May 1999.
Motorola, Inc. Data Sheets: "Micropower Voltage Regulator", pp. 1 and 2, Jan. 1997.
National Semiconductor Data Sheet: "MM54HC00/ MM74HC00 Quad 2–Input NAND Gate", p. 3–3. May 1999.
"New Active RFID System Senses Temperature, Reads from 30 Meters." Automatic ID News, Mar., 1999.
MacNaull, Steve, Identec Web Pages, "High–Tech, Safe Food Delivery." Mar. 11, 1999.

*Primary Examiner*—Donnie L. Crosland
*Attorney, Agent, or Firm*—Well, St. John, Roberts, Gregory & Matkin, P.S.

[57] ABSTRACT

A communications system including a radio frequency identification device including an integrated circuit having a single die including a microprocessor, a receiver coupled to the microprocessor, and a backscatter transmitter coupled to the microprocessor, the integrated circuit having a digital output, and the receiver being configured to receive wireless communications from a remote interrogator; and a digital to analog converter external of the single die and having a digital input coupled to the digital output of the integrated circuit, and having an analog output configured to be coupled to an analog device. A communications method including coupling a digital to analog converter to a radio frequency identification device.

36 Claims, 3 Drawing Sheets

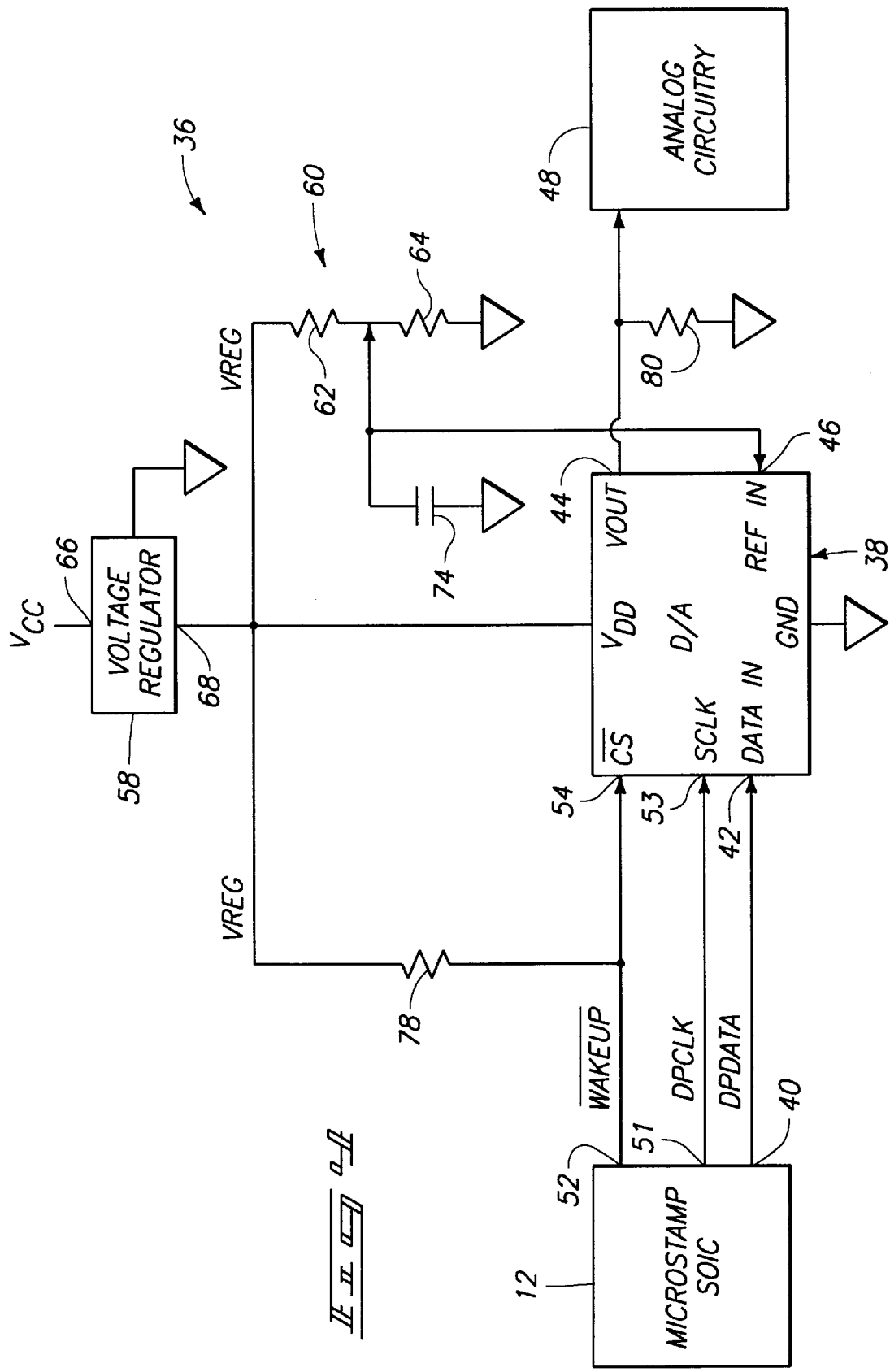

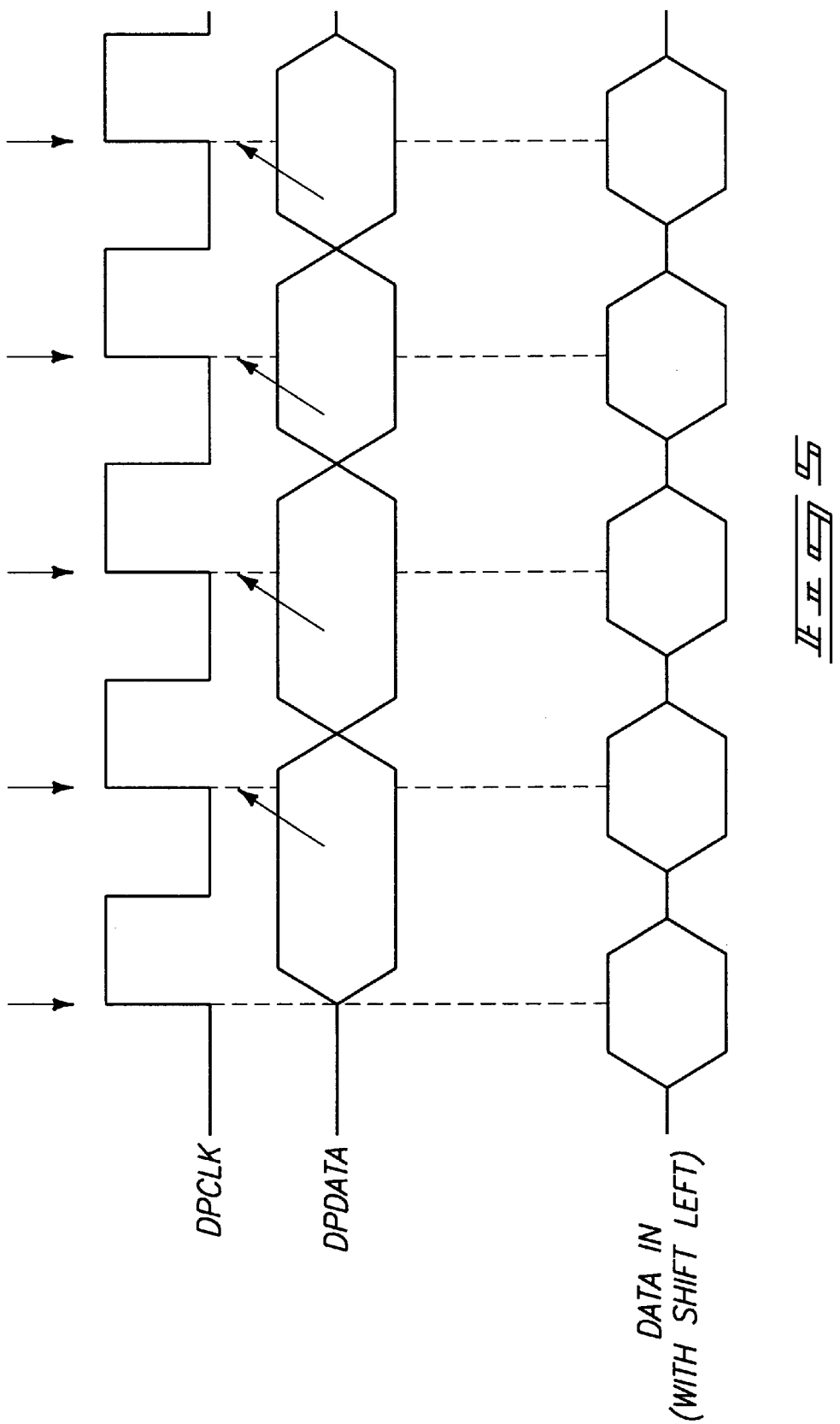

COMMUNICATIONS SYSTEM AND METHOD WITH D/A CONVERTER

TECHNICAL FIELD

This invention relates to systems and methods for monitoring parameters and for remote data telemetry. The invention also relates to radio frequency identification devices.

BACKGROUND OF THE INVENTION

Electronic identification devices, such as radio frequency identification devices (RFIDs), are known in the art. Such devices are typically used for inventory tracking. As large numbers of objects are moved in inventory, product manufacturing, and merchandising operations, there is a continuous challenge to accurately monitor the location and flow of objects. Additionally, there is a continuing goal to determine the location of objects in an inexpensive and streamlined manner. One way of tracking objects is with an electronic identification system.

One presently available electronic identification system utilizes a magnetic coupling system. In some cases, an identification device may be provided with a unique identification code in order to distinguish between a number of different devices. Typically, the devices are entirely passive (have no power supply), which results in a small and portable package. However, such identification systems are only capable of operation over a relatively short range, limited by the size of a magnetic field used to supply power to the devices and to communicate with the devices.

Another type of wireless electronic identification system is an active wireless electronic identification system. Attention is directed towards commonly assigned U.S. patent application Ser. No. 08/705,043, filed Aug. 29, 1996, and incorporated herein by reference, which describes such active systems in detail. One such system is sold by Micron Communications Inc., 3176 S. Denver Way, Boise, Id. 83705 under the trademark Microstamp Engine (TM). These systems include integrated circuit devices which include an active transponder and are intended to be affixed to an object to be monitored. The devices are capable of receiving and processing instructions transmitted by an interrogator. A device receives the instruction, if within range, then processes the instruction and transmits a response, if appropriate. The interrogation signal and the responsive signal are typically radio-frequency (RF) signals produced by an RF transmitter circuit. Because active devices have their own power sources, and do not need to be in close proximity to an interrogator or reader to receive power via magnetic coupling. Therefore, active transponder devices tend to be more suitable for applications requiring tracking of a tagged device that may not be in close proximity to an interrogator. For example, active transponder devices tend to be more suitable for inventory control or tracking.

Because the Microstamp Engine (TM) is capable of communications, it can be used for applications other than just inventory tracking and other typical RFID applications.

SUMMARY OF THE INVENTION

The invention provides a wireless identification device configured to provide a signal to identify the device in response to an interrogation signal. In addition, one aspect of the invention provides coupling a digital to analog converter to the wireless identification device.

The invention also provides a communications system comprising a radio frequency identification device including an integrated circuit and method for converting a digital signal to an analog signal. The integrated circuit has a single die including a microprocessor, a receiver coupled to the microprocessor, a backscatter transmitter, and a digital output coupled to the microprocessor. The receiver is configured to receive wireless communications from a remote interrogator. The communications system further includes a digital to analog converter external of the single die. The digital to analog converter has a digital input coupled to the digital output of the integrated circuit, and has an analog output configured to be coupled to a remote analog device that utilizes a DC voltage input; e.g., for machine control circuitry, motion control circuitry, biasing of input switches, pre-scaling of window comparators, or for any other analog device that utilizes a DC voltage input.

BRIEF DESCRIPTION OF THE DRAWINGS

Preferred embodiments of the invention are described below with reference to the following accompanying drawings.

FIG. 4 is a circuit schematic of circuitry in accordance with one embodiment of the invention.

FIG. 5 is a timing diagram illustrating operation of circuitry included in the circuit schematic of FIG. 4.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
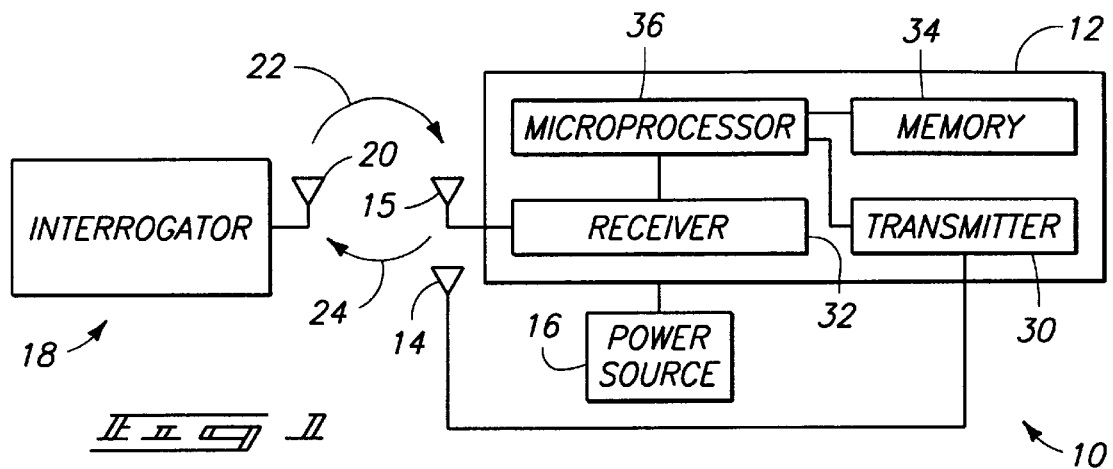
FIG. 1 is a high level circuit schematic showing an interrogator and a radio frequency identification device embodying the invention.

FIG. 1 illustrates a wireless identification device 10 in accordance with one embodiment of the invention. In the illustrated embodiment, the wireless identification device is a radio frequency data communication device 10, and includes RFID circuitry 12. The device 10 further includes an antenna 14 connected to the circuitry 12 for wireless or radio frequency transmission by the circuitry 12 and an antenna 15 coupled to the circuitry 12 for wireless or radio frequency reception by the circuitry 12. In one embodiment, the antennas 14 and 15 are microstrip antennas. In the illustrated embodiment, the RFID circuitry is defined by an integrated circuit as described in the above-incorporated patent application Ser. No. 08/705,043, filed Aug. 29, 1996. Other embodiments are possible. A power source or supply 16 is connected to the integrated circuit 12 to supply power to the integrated circuit 12. In one embodiment, the power source 16 comprises a battery.

The device 10 transmits and receives radio frequency communications to and from an interrogator 18. An exemplary interrogator is described in commonly assigned U.S. Pat. No. 5,842,118, issued Nov. 24, 1998, and incorporated herein by reference. Preferably, the interrogator 18 includes an antenna 20, as well as dedicated transmitting and receiving circuitry, complementary to that implemented on the integrated circuit 12.

Generally, the interrogator 18 transmits an interrogation signal or command 22 via the antenna 20. The device 10 receives the incoming interrogation signal via antenna 15. Upon receiving the signal 22, the device 10 responds by generating and transmitting a responsive signal or reply 24 via antenna 14. The responsive signal 24 typically includes information that uniquely identifies, or labels the particular device 12 that is transmitting, so as to identify any object or person with which the device 12 is associated.

Although only one device 10 is shown in FIG. 1, typically there will be multiple devices 10 that correspond with the interrogator 18, and the particular devices 10 that are in communication with the interrogator 18 will typically change over time. In the illustrated embodiment in FIG. 1, there is no communication between multiple devices 10. Instead, the devices 10 respectively communicate with the interrogator 18. Multiple devices 10 can be used in the same field of an interrogator 18 (i.e., within communications range of an interrogator 18).

The device 10 can be included in any appropriate housing or packaging. Various methods of manufacturing housings are described in commonly assigned U.S. patent application Ser. No. 08/800,037, filed Feb. 13, 1997, and incorporated herein by reference.

Figure 2:
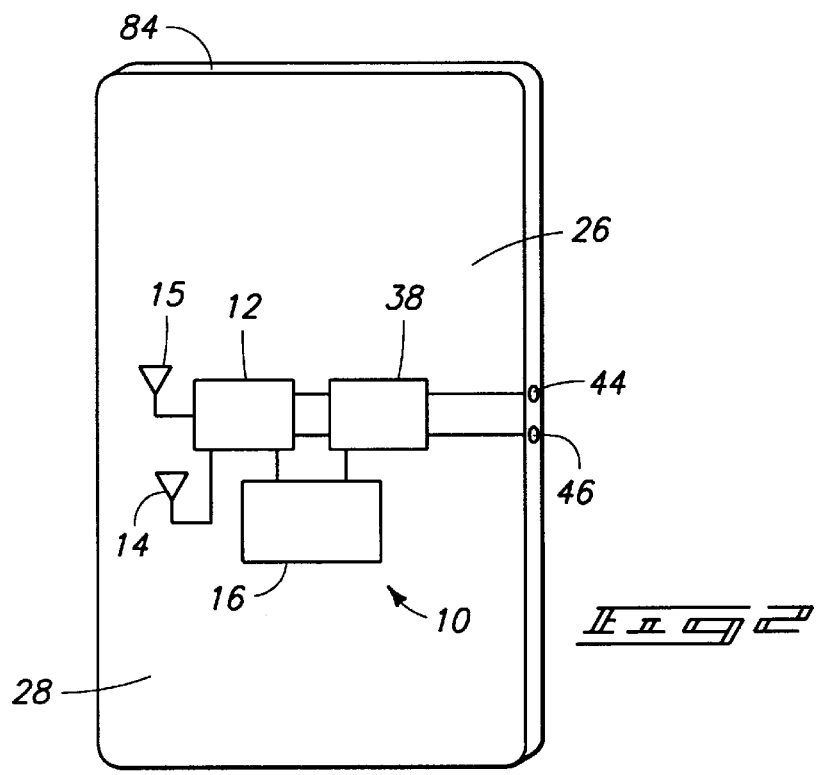
FIG. 2 is a front view of a housing, in the form of a badge or card, supporting the circuit of FIG. 1 according to one embodiment of the invention.

FIG. 2 shows but one embodiment in the form of a card or badge 26 including a housing 28 of plastic or other suitable material supporting the device 10 and the power supply 16. In one embodiment, a face of the badge 26 has visual identification features such as graphics, text, information found on identification or credit cards, etc.

Figure 3:
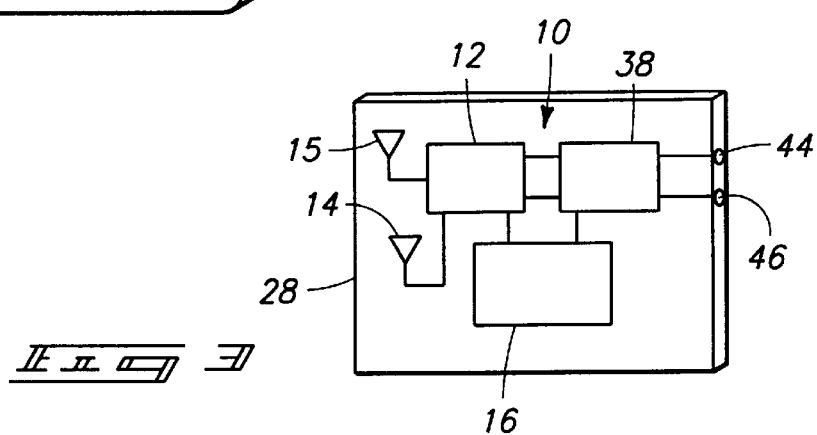
FIG. 3 is a front view of a housing supporting the circuit of FIG. 1 according to another embodiment of the invention.

FIG. 3 illustrates but one alternative housing supporting the device 10. More particularly, FIG. 3 shows a miniature housing 28 encasing the device 10 and power supply 16 to define a tag which can be supported by an object (e.g., hung from an object, affixed to an object, etc.). Although two particular types of housings have been disclosed, other forms of housings are employed in alternative embodiments.

If the power supply 16 is a battery, the battery can take any suitable form. Preferably, the battery type will be selected depending on weight, size, and life requirements for a particular application. In one embodiment, the battery 16 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the power source 16 comprises a series connected pair of button type cells. In other alternative embodiments, other types of suitable power source are employed.

The circuitry 12 provides a responsive signal to the interrogator 18 by radio frequency. More particularly, the circuitry 12 comprises an integrated circuit including a single die having a backscatter transmitter 30, a receiver 32, a memory 34, and a microprocessor 36 coupled to the transmitter 30, receiver 32, and memory 34 (FIG. 1) as is described in U.S. patent application Ser. No. 08/705,043.

Radio frequency identification has emerged as a viable and affordable alternative to tagging or labeling small to large quantities of items. The interrogator 18 communicates with the devices 10 via an electromagnetic link, such as via an RF link (e.g., at microwave frequencies, in one embodiment), so all transmissions by the interrogator 18 are heard simultaneously by all devices 10 within range.

FIG. 4 illustrates a communications system 36 in accordance with one embodiment of the invention. The communications system 36 includes a digital to analog converter 38 coupled to the integrated circuit 12. The digital to analog converter 38 is external of the single die integrated circuit 12.

The integrated circuit 12 has a digital output 40. The digital to analog converter 38 has a digital input 42 coupled to the digital output 40 of the integrated circuit 12. The analog to digital converter 38 further has an analog output 44 coupled to analog circuitry 48 that utilizes a DC voltage input; e.g., for machine control circuitry, for motion control circuitry, for biasing of input switches, for pre-scaling of window comparators, or for any other analog device that utilizes a DC voltage input.

The integrated circuit 12 further has a clock output 51, and the digital to analog converter 38 has a clock input 53 coupled to the clock output 51.

A signal is produced at the wakeup output 52 to trigger the chip select input 54 in response to the receiver 32 (of FIG. 1) receiving a wireless communication. The digital to analog converter 38 further has a chip select input 54 which, when triggered by the integrated circuit's wakeup output 52, initiates a digital to analog conversion.

In response to the receiver 32 (of FIG. 1) receiving an output digital value command from the interrogator 18, the integrated circuit 12 (FIG. 4) provides a signal at the wakeup output 52 and outputs a digital value at the digital output 40 corresponding to a digital value that was received by wireless communication from the interrogator 18 (FIG. 1).

The digital to analog converter 38 provides an analog signal at analog output 44, after performing a digital to analog conversion, in response to an output digital value command from the interrogator 18. More particularly, after the interrogator 18 transmits an output digital value command and transmits a digital value to be output at digital output port 40, the digital to analog converter initiates a digital to analog conversion of the digital value provided at digital input 42. The analog conversion is provided at the output 44.

The digital to analog converter 38 has a voltage supply input, a ground connector, and a reference voltage input 46.

The communications system 36 further comprises a voltage divider 60 made up of resistors 62 and 64, supplying a reference voltage to the input 46. The purpose of the voltage divider 60 is to provide a reference voltage for the digital to analog converter 38. This reference voltage determines the effective voltage range of the output of the digital to analog converter 38. In the illustrated embodiment (if resistors are of equal value), the desired voltage reference produced by the voltage divider 60 is approximately equal to half of the regulated voltage VREG. The digital to analog converter has an output that is two times the reference voltage.

In one embodiment, the communications system 36 further includes a voltage regulator 58 having an input 66 coupled to a voltage supply $V_{CC}$, and having an output 68 providing a regulated voltage VREG. The output 68 is coupled to the reference voltage input 46 via the voltage divider 60, to the chip select input 54 via a pull up resistor 78, and to the voltage supply input ($V_{DD}$) of the digital to analog converter. The voltage regulator 58 increases accuracy of the analog output 44 by providing a stable voltage supply as well as decreased power consumption. In an alternative embodiment, the voltage regulator 58 is omitted. In one embodiment, the voltage supply $V_{CC}$ is a thin profile or button type battery that also supplies power to the integrated circuit 12.

To better enable one of ordinary skill in the art to practice the invention, various specific component values will now be provided. It is to be understood, however, that various alternative embodiments can be employed and these component values are not intended to limit the invention. In the illustrated embodiment, the integrated circuit 12 is a Microstamp Engine SOIC (TM) integrated circuit, part number MSEM256X10SG available from Micron Communications, 3176 S. Denver Way, Boise, Id. 83705, and has the following pin assignments (not shown): a pin 2 defines the wakeup output 52; a pin 18 defines the i clock output 51; and a pin 17 defines the digital output 40. Also, in the preferred embodiments, the digital to analog converter 38 is a digital to analog converter integrated circuit, part number TLC5615 available from Texas Instruments or a part number MAX515 available from Maxim. More particularly, in the illustrated embodiment, the digital to analog converter 38 is a part number MAX515 available from Maxim and has the following pin assignments: a pin 1 defines the digital input 42; a pin 2 defines the clock input 53; a pin 3 defines the chip select input 54; a pin 6 defines the reference voltage input 46; a pin 7 defines the analog voltage output 44. Other digital to analog converters can be employed. Also, in one embodiment that includes the voltage regulator 58, the voltage regulator 58 is a Micropower Voltage Regulator (TM), part number MC78LC50 available from Motorola, and has the following pin assignments: a pin 1 defines a ground connector; a pin 2 defines the input 66; and a pin 3 defines an output 68 (FIG. 4). In the embodiment shown in FIG. 4, a capacitor 74 is coupled between the voltage divider 60 and ground; and a resistor 78 is coupled between the output 68 of the voltage regulator 58 and the chip select input 54. In the illustrated embodiment, the capacitor 74 has a value of 0.1 $\mu$F, the resistor 78 has a value of 100 k$\Omega$, the resistor 62 has a value of 1 k$\Omega$, and the resistor 64 has a value of 1 k$\Omega$. A resistor 80 is coupled between the analog output 44 and ground and, in the illustrated embodiment, has a value of at least 2 k$\Omega$ (more particularly, 10 k$\Omega$ in the illustrated embodiment). Alternative values can be used as appropriate; for example, if a TLC5615 is used instead of the MAX515, the voltage divider 60 will change values from 1 k$\Omega$ to at least 10 k$\Omega$ due to a higher input resistance of the TLC5615. The MAX515 has a 40 k$\Omega$ input resistance.

Data is written to the digital to analog converter 38 via the integrated circuit 12 from the interrogator 18 (of FIG. 1). A "write digital port" command for transmission to the digital to analog converter 38 is used. In the preferred embodiment, this data is shifted left by the interrogator 18 prior to being transmitted to the integrated circuit 12 as shown in FIG. 5. The interrogator 18 and its associated software format the data, and the integrated circuit 12 acts as a data pipeline to the digital to analog converter 38.

More particularly, the MAX515 digital to analog converter 38 and the Microstamp (TM) integrated circuit 12 use different clock edges to determine when serial data in is valid. Both the integrated circuit 12 and the digital to analog converter 38 use the rising edge of the clock to shifts bits one position from right to left. The digital to analog converter 38 latches in valid data bits from the data in input 42 on the rising edge of the clock DPCLK. The integrated circuit 12 uses the rising edge of a system clock to output new data to the DPDATA output 40 and considers the data to be valid on the falling edge of the system clock. Two bytes from the integrated circuit 12 are required to update the digital to analog converter 38. To make the digital to analog converter 38 compatible with the integrated circuit 12, data sent to the integrated circuit 12 for transmission to the digital to analog converter 38 is formatted as follows.

First byte written by the integrated circuit 12:

D7—Don't care (MSB, $2^{nd}$ latched bit in D/A converter).
D6—Don't care
D5—Don't care
D4—D/A bit 9
D3—D/A bit 8
D2—D/A bit 7
D1—D/A bit 6
D0—D/A bit 5 (LSB, $9^{th}$ latched bit in D/A converter).

Second byte written by the integrated circuit 12:

D7=D/A bit 4 (MSB, $10^{th}$ latched bit in D/A converter).
D6—D/A bit 3
D5—D/A Bit 2
D4—D/A bit 1
D3—D/A bit 0
D2—Don't care
D1—Don't care—16th bit latched in the D/A converter
D0 (LSB)—Don't care—ignored by the D/A The digital to analog converter 38 will actually latch in the first bit of a given update before the integrated circuit 12 has output a bit, but the digital to analog converter treats the first bit as a "Don't care". Using this method of formatting data (two bytes per update), the digital to analog converter may be updated up to 32 times with one RF "write digital port" command from the interrogator 18 to the integrated circuit 12. With the thirty-two samples, more accurate control of the analog circuitry 48 is possible.

Another aspect of the invention provides a method of manufacturing and using the communications system 36 (of FIG. 4). The method comprises supporting the monolithic semiconductor integrated circuit 12 from a substrate. The substrate can be a circuit board or other sheet capable of supporting integrated circuits thereon. In the illustrated embodiment, the substrate comprises a plastic sheet 84 that makes up a portion of the housing 28 (FIG. 2). Alternative substrates are possible.

The microstrip antenna 15 (of FIG. 2) is supported from the substrate 84, external of the integrated circuit 12, and the microstrip antenna 15 is electrically coupled to the receiver 32. For example, in one embodiment, printed thick film is printed on the substrate to define the antenna 15 and intersects a pin on the integrated circuit 12 for electrical coupling to the receiver 32.

The microstrip antenna 14 is supported from the substrate 84, external of the integrated circuit 12, and the microstrip antenna 14 is electrically coupled to the transmitter 30. For example, in one embodiment, printed thick film is printed on the substrate to define the antenna 15 and intersects a pin on the integrated circuit 12 for electrical coupling to the receiver 32 as described in commonly assigned U.S. patent application Ser. No. 08/800,037, filed Feb. 13, 1997.

The battery 16 is supported from the substrate, and electrically coupled to the integrated circuit 12 to supply operating power to the integrated circuit 12.

The digital to analog converter 38 is coupled to the integrated circuit 12. In one embodiment, the digital to analog converter 38 is coupled to the integrated circuit 12, and the battery 16 is coupled to the integrated circuit substantially at the same time by mounting the digital to analog converter 38, battery 16, and integrated circuit 12 onto traces (e.g., printed thick film in one embodiment) drawn on the substrate 84 or circuit board. Assembly can take place in a manner similar to that disclosed in commonly assigned U.S. patent application Ser. No. 08/800,037, filed Feb. 13, 1997.

Thus, a communications system is provided where analog systems can be remotely controlled by transmitting an RF command over a range longer than is possible with magnetic coupling. This is accomplished using an integrated circuit having a microprocessor, receiver, memory, and backscatter transmitter.

In compliance with the statute, the invention has been described in language more or less specific as to structural and methodical features. It is to be understood, however, that the invention is not limited to th e specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A communications system comprising:
    a radio frequency identification device including an integrated circuit having a single die including a microprocessor, a receiver coupled to the microprocessor, and a backscatter transmitter coupled to the microprocessor, the integrated circuit having a digital output, and the receiver being configured to receive wireless communications from a remote interrogator; and
    a digital to analog converter external of the single die and having a digital input coupled to the digital output of the integrated circuit, and having an analog output configured to be coupled to an analog device, wherein the radio frequency identification device is configured to receive a digital wireless communication indicative of a desired analog value to be applied to the analog device from the backscatter transmitter.

2. A communications system in accordance with claim 1 wherein the integrated circuit is configured to provide at the digital output a digital value indicative of the received digital wireless communication, wherein digital to analog converter is configured to convert a digital value at the digital output of the integrated circuit to an analog value and to provide the analog value at the analog output of the digital to analog converter.

3. A communications system in accordance with claim 2 and further comprising a voltage regulator coupled to the digital to analog converter to supply regulated power to the digital to analog converter.

4. A communications system comprising:
    a radio frequency identification device including an integrated circuit having a single die including a microprocessor, a receiver coupled to the microprocessor, a backscatter transmitter coupled to the microprocessor, the integrated circuit having a digital output, the receiver being configured to receive wireless communications from a remote interrogator; and
    a digital to analog converter external of the single die and having a digital input coupled to the digital output of the integrated circuit, having an analog output configured to be coupled to an analog device, and having a chip select input which, in response to being triggered, enables a digital to analog conversion, wherein the radio frequency identification device is configured to receive a signal, indicative of a digital value to be applied to the digital to analog converter, from the backscatter transmitter, and wherein the integrated circuit has a wakeup output, coupled to the chip select input, at which a signal is produced configured to trigger the chip select input in response to the receiver receiving a wireless communication.

5. A communications system in accordance with claim 4 wherein, in response to the receiver receiving the signal indicative of a digital value to be applied to the digital input, the integrated circuit is configured to apply the digital value to the digital output and to provide a signal at the wakeup output.

6. A communications system in accordance with claim 4 wherein the digital to analog converter has a voltage supply input, and wherein the communications system further comprises a voltage regulator coupled to the voltage supply input.

7. A communications system comprising:
    a radio frequency identification device including an integrated circuit having a single die including a microprocessor, a receiver coupled to the microprocessor, and a backscatter transmitter coupled to the microprocessor, the integrated circuit having a digital output, the receiver being configured to receive wireless commands from a remote interrogator;
    a digital to analog converter external of the single die and having a digital input coupled to the digital output of the integrated circuit, having an analog output configured to be coupled to an analog device, and having a chip select input which, in response to being triggered, enables a digital to analog conversion, wherein the radio frequency identification device is configured to receive a digital RF command indicative of the desired analog output, and wherein the integrated circuit has a wakeup output at which a trigger signal is produced configured to trigger the chip select input in response to the receiver receiving a predetermined wireless command, wherein the digital RF command includes binary data to be transferred to the digital to analog converter, the data being shifted left prior to being transferred from the radio frequency identification device to the digital to analog converter.

8. A communications system in accordance with claim 7 wherein two bytes are transferred from the radio frequency identification device to the digital to analog converter per digital RF command indicative of the desired analog output.

9. A communications system in accordance with claim 8 wherein the two bytes transferred from the radio frequency identification device to the digital to analog converter include a first transferred bit which corresponds to a second bit latched by the digital to analog converter.

10. A communications system in accordance with claim 9 wherein the digital to analog converter ignores the first bit latched per RF digital command indicative of the desired analog output.

11. A communications system in accordance with claim 8 and further including an analog device having an input coupled to the analog output of the digital to analog converter.

12. A communications system in accordance with claim 7 and further comprising an analog control circuit coupled to the analog output.

13. A communications system for use with a remote interrogator, the system comprising:
    a wireless communication device including:
        a substrate;
        a monolithic semiconductor integrated circuit, supported by the substrate, including a processor, a receiver coupled to the processor, and a backscatter transmitter coupled to the processor, and a digital output coupled to the microprocessor, the transmitter being configured to transmit in response to the receiver receiving a carrier signal from an interrogator; and
        a battery, supported by the substrate, electrically coupled to the integrated circuit and configured to generate operating power for the communications device; and a digital to analog converter external of the integrated circuit and having a digital input coupled to the digital output of the integrated circuit, having an analog output configured to be coupled to an analog device, wherein the integrated circuit is configured to receive via radio frequency a "write digital port" command from the interrogator, the command including digital data representative of an analog value desired to be applied to the analog device, the integrated circuit being configured to transfer the digital data to the digital to analog converter and the digital to analog converter being configured to produce an analog DC voltage, at the analog output, for the analog device.

14. A communications system in accordance with claim 13 and further comprising a voltage regulator coupled to the digital to analog converter to supply regulated power to the digital to analog converter.

15. A communications system in accordance with claim 14 wherein the digital to analog converter further includes a reference voltage input that is coupled to the voltage regulator.

16. A communications system in accordance with claim 15 and further comprising a variable voltage divider coupled between the reference voltage input and the voltage regulator.

17. A communications system in accordance with claim 14 and further comprising an analog device coupled to the analog output of the digital to analog converter.

18. A communications method comprising:
coupling a digital to analog converter to a radio frequency identification device of a type including an integrated circuit having a single die including a microprocessor, a receiver coupled to the microprocessor, and a backscatter transmitter coupled to the microprocessor, the integrated circuit having a digital output, and the receiver being configured to receive wireless communications from a remote interrogator, the digital to analog converter having a digital input and having an analog output configured to be coupled to an analog control circuit, the coupling of the digital to analog converter to the radio frequency identification device comprising coupling the digital input of the digital to analog converter to the digital output of the integrated circuit.

19. A communications method in accordance with claim 18 and further comprising providing, at the digital output of the integrated circuit a digital value indicative of the received digital wireless communication, converting, with the digital to analog converter, a digital value at the digital output of the integrated circuit to an analog value, and providing the analog value at the analog output of the digital to analog converter.

20. A communications method in accordance with claim 19 and further comprising supplying regulated power to the digital to analog converter, using a voltage regulator.

21. A communications method comprising:
coupling a digital to analog converter to a radio frequency identification device of a type including an integrated circuit having a single die including a microprocessor, a receiver coupled to the microprocessor, and a backscatter transmitter coupled to the microprocessor, the integrated circuit having a digital output, and having a wakeup output at which a signal is produced in response to the receiver receiving a wireless communication, and the receiver being configured to receive wireless communications from a remote interrogator, the digital to analog converter having a digital input, having an analog output configured to be coupled to an analog device, and having a chip select input which, in response to being triggered, enables a digital to analog conversion, the coupling of the digital to analog converter to the radio frequency identification device comprising coupling the digital input of the digital to analog converter to the digital output of the integrated circuit and coupling the chip select input to the wakeup output.

22. A communications method in accordance with claim 21 and further comprising providing, with the integrated circuit, a signal at the wakeup output, and reading, with the digital to analog converter, the digital input, in response to the receiver receiving a "write digital port" command.

23. A communications method in accordance with claim 21 wherein the digital to analog converter has a voltage supply input, and wherein the communications method further comprises coupling a voltage regulator to the voltage supply input.

24. A communications method comprising:
coupling a digital to analog converter to a radio frequency identification device of a type including an integrated circuit having a single die including a microprocessor, a receiver coupled to the microprocessor, and a backscatter transmitter coupled to the microprocessor, the integrated circuit having a digital input, and the receiver being configured to receive wireless communications from a remote interrogator, including a wireless "write digital port" command which includes digital data to be transferred to the digital output, the digital to analog converter having a digital input, having an analog output configured to be coupled to an analog device, the coupling of the analog to digital converter to the radio frequency identification device comprising coupling the digital input of the digital to analog converter to the digital output of the integrated circuit; and
causing the digital to analog converter to perform multiple conversions from digital to analog per "write digital port" command.

25. A communications method in accordance with claim 24 wherein the "write digital port" command includes binary data to be transferred to the digital to analog converter, and wherein causing the digital to analog converter to perform multiple conversions from digital to analog per "write digital port" command comprises shifting the binary data left prior to transmission from the interrogator to the integrated circuit.

26. A communications method in accordance with claim 24 wherein two bytes are transferred from the radio frequency identification device to the digital to analog converter per "write digital port" command.

27. A communications method in accordance with claim 26 wherein the two bytes transferred from the radio frequency identification device to the digital to analog converter include a first transferred bit which corresponds to a second bit latched by the digital to analog converter.

28. A communications method in accordance with claim 27 wherein the digital to analog converter ignores the first bit latched per "write digital port" command.

29. A communications method in accordance with claim 24 and further comprising coupling the analog output of the digital to analog converter to an analog input of an analog device.

30. A method of manufacturing and using a communications system with a remote interrogator unit, the method comprising:

supporting a monolithic semiconductor integrated circuit from a substrate, the integrated circuit being of a type including a processor, a receiver coupled to the processor, a backscatter transmitter coupled to the processor, a wakeup output configured to produce a wakeup signal in response to the receiver receiving a wireless communication, and a digital output coupled to the microprocessor, the transmitter being configured to transmit in response to the receiver receiving a carrier signal from an interrogator;

supporting a battery from the substrate, and electrically coupling the battery to the integrated circuit to supply operating power to the integrated circuit;

coupling a digital to analog converter to the integrated circuit, the digital to analog converter having a digital input, having an analog output configured to be coupled to an analog control circuit, and having a chip select input which, in response to being triggered, enables a digital to analog conversion, the coupling of the digital to analog converter to the integrated circuit comprising coupling the digital output to the digital input;

coupling the wakeup output to the chip select input; and transmitting a digital wireless command from a remote interrogator unit to the integrated circuit, the command including digital data representative of a desired analog voltage;

transferring the digital data from the integrated circuit to the digital to analog converter; and providing an analog voltage at the analog output of the digital to analog converter representative of the digital data.

31. A method in accordance with claim 30 and further comprising supplying power to the digital to analog converter from a regulated voltage source.

32. A method in accordance with claim 31 wherein the digital to analog converter further includes a reference voltage input that is coupled to the regulated voltage source.

33. A method in accordance with claim 32 and further comprising coupling a variable voltage divider between the reference voltage input and the voltage regulator.

34. A method in accordance with claim 30 wherein the digital to analog converter performs multiple conversions per digital command.

35. A method in accordance with claim 30 and further comprising an analog device coupled to the analog output of the digital to analog converter.

36. A method comprising:

determining a desired analog voltage for controlling an analog process;

transmitting a digital value representative of the desired analog voltage via radio frequency;

receiving the digital value with a receiver of a wireless communications device of the type having an integrated circuit including a processor, a receiver coupled to the processor, a backscatter transmitter coupled to the processor, the transmitter being configured to transmit in response to the receiver receiving a carrier signal from an interrogator;

transferring the digital value to a digital to analog converter external of the wireless communications device;

converting the digital value to an analog voltage using the digital to analog converter; and controlling an analog process using the analog voltage.

* * * * *

UNITED STATES PATENT AND TRADEMARK OFFICE
CERTIFICATE OF CORRECTION

PATENT NO. : 6,137,422

DATED : October 24, 2000

INVENTOR(S) : Scott Hahn and Mark T. Van Horn

It is certified that error appears in the above-identified patent and that said Letters Patent is hereby corrected as shown below:

Column 2, line 51, after "circuitry", insert --12--.

Column 2, line 61, replace "Pat. No. 5,842,188, issued Nov. 24, 1998," with --Serial No. 08/907,689, filed August 8, 1997--.

Column 5, line 6, after "the", delete "i".

Column 7, line 7, replace "th e", with --the--.

Signed and Sealed this

Twenty-second Day of May, 2001

Attest:

NICHOLAS P. GODICI

Attesting Officer

Acting Director of the United States Patent and Trademark Office